United States Patent
Xie

(10) Patent No.: US 11,194,297 B2
(45) Date of Patent: Dec. 7, 2021

(54) METHOD AND APPARATUS FOR CONTROLLING ALARM CLOCK

(71) Applicant: Beijing Xiaomi Mobile Software Co., Ltd., Beijing (CN)

(72) Inventor: Yan Xie, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 672 days.

(21) Appl. No.: 16/039,782

(22) Filed: Jul. 19, 2018

(65) Prior Publication Data

US 2019/0121298 A1 Apr. 25, 2019

(30) Foreign Application Priority Data

Oct. 23, 2017 (CN) .......................... 201710991759.4

(51) Int. Cl.
*G04G 13/02* (2006.01)
*G04G 21/02* (2010.01)
(Continued)

(52) U.S. Cl.
CPC ......... *G04G 13/021* (2013.01); *G04G 13/026* (2013.01); *G04G 21/025* (2013.01); *H04M 1/72412* (2021.01); *H04W 4/023* (2013.01)

(58) Field of Classification Search
CPC .................................................. G04G 13/021
See application file for complete search history.

(56) References Cited

U.S. PATENT DOCUMENTS

| 2014/0269223 A1 | 9/2014 | Mokhnatkina et al. |
| 2016/0187856 A1 | 6/2016 | Vilermo et al. |

(Continued)

FOREIGN PATENT DOCUMENTS

| CN | 103929835 A | 7/2014 |
| CN | 104580730 A | 4/2015 |

(Continued)

OTHER PUBLICATIONS

Office Action dated Jan. 17, 2020 in corresponding Japanese Patent Application No. 2018-529625 (with English Tranlation), 13 pages.

(Continued)

*Primary Examiner* — Edwin A. Leon
*Assistant Examiner* — Jason M Collins
(74) *Attorney, Agent, or Firm* — Oblon, McClelland, Maier & Neustadt, L.L.P.

(57) ABSTRACT

Embodiments of the present disclosure disclose methods and apparatuses for controlling an alarm clock. Processing circuitry of an apparatus determines an alarm time for the alarm clock of a first terminal device. When a time difference between a present time of the first terminal device and the alarm time is determined to reach a preset duration, the processing circuitry determines whether a second terminal device is located within a reachable distance from the first terminal device. The second terminal device is associated with a first wearable device used by a user. When the second terminal device is determined to be located within the reachable distance from the first terminal device, the processing circuitry acquires, from the first wearable device, a sleep signal indicating a sleeping status of the user, and controls the alarm clock and a second wearable device associated with the first terminal device based on the sleep signal.

18 Claims, 11 Drawing Sheets

(51) Int. Cl.
*H04M 1/72412* (2021.01)
*H04W 4/02* (2018.01)

(56) References Cited

U.S. PATENT DOCUMENTS

2017/0094046 A1    3/2017  Raymann et al.
2017/0277133 A1*   9/2017  Patton .................... G04C 21/12

FOREIGN PATENT DOCUMENTS

| CN | 105991824 A | 10/2016 |
| CN | 107635074 A | 1/2018 |
| GB | 2 426 080 A | 11/2006 |

OTHER PUBLICATIONS

International Search Report dated Jul. 17, 2018 in PCT/CN2018/083948 (with English translation of Categories of Cited Documents), 11 pages.
Extended European Search Report dated Mar. 19, 2019 in European Patent Application No. 18200515.7, 7 pages.

* cited by examiner

METHOD AND APPARATUS FOR CONTROLLING ALARM CLOCK

CROSS-REFERENCE TO RELATED APPLICATIONS

This application is based on and claims the priority to the Chinese Patent Application No. 201710991759.4 filed on Oct. 23, 2017, the entire contents of which are incorporated herein by reference.

TECHNICAL FIELD

The present disclosure relates to a field of communication technology, and more particularly, to methods and apparatuses for controlling an alarm clock.

BACKGROUND

In order to complete events in a preset schedule in time, an alarm clock application may generally be used to remind a user. With a population of smart devices, an increasing number of users use a smart alarm clock application provided by the smart device to perform an event reminder.

In related arts, the user may use an alarm clock function or a vibration function of the smart alarm clock application, and when a time point set by the user is reached, the alarm clock function or the vibration function may be triggered to remind the user. When there are a number of users, how to perform a flexible controlling of the alarm clock becomes a technical problem to be solved.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

In order to overcome problems in the related arts, embodiments of the present disclosure provide methods and apparatuses for controlling an alarm clock, such that the alarm clock may be controlled flexibly.

Embodiments of the present disclosure disclose a method and an apparatus for controlling an alarm clock. Processing circuitry of an apparatus determines an alarm time for the alarm clock of a first terminal device. When a time difference between a present time of the first terminal device and the alarm time is determined to reach a preset duration, the processing circuitry determines whether a second terminal device is located within a reachable distance from the first terminal device. The second terminal device is associated with a first wearable device used by a user. When the second terminal device is determined to be located within the reachable distance from the first terminal device, the processing circuitry acquires, from the first wearable device, a sleep signal indicating a sleeping status of the user, and controls the alarm clock and a second wearable device associated with the first terminal device based on the sleep signal.

In some embodiments, when the sleep signal indicates that the user is in a sleep state, the processing circuitry sends a control signal to the second wearable device to cause the second wearable device to vibrate at the alarm time, and turns off the alarm clock of the first terminal device.

In some embodiments, when the sleep signal indicates that the user is in an awake state, the processing circuitry further determines whether one or more additional terminal devices are located within the reachable distance from the first terminal device. The one or more additional terminal devices are associated with one or more additional wearable devices. When the one or more additional devices are determined to be located within the reachable distance from the first terminal device, the processing circuitry acquires, from the corresponding one or more additional wearable devices, one or more additional sleep signals indicating sleeping status of one or more additional users of the one or more additional wearable devices. When the one or more additional sleep signals indicate that each of the one or more additional users is in an awake state, the processing circuitry controls the first terminal device to trigger the alarm clock at the alarm time. When the one or more additional devices are determined not to be located within the reachable distance from the first terminal device, the processing circuitry controls the first terminal device to trigger the alarm clock at the alarm time.

In some embodiments, the processing circuitry determines whether the second terminal device is connected to the first terminal device wirelessly using Bluetooth. When the second terminal device is determined to be connected to the first terminal device wirelessly using Bluetooth, the processing circuitry determines that the second terminal device is located within the reachable distance from the first terminal device.

In some embodiments, the processing circuitry determines whether the second terminal device is connected to the first terminal device wirelessly using one of: WiFi, a WiFi hotspot, and a mobile network. When the second terminal device is determined to be connected to the first terminal device wirelessly, the processing circuitry determines a distance between the first terminal device and the second terminal device, and determines whether the second terminal device is located within the reachable distance from the first terminal device based on the distance and a preset distance.

In some embodiments, the processing circuitry determines whether the first terminal device and the second terminal device are connected to a same wireless router or a same wireless access point. When the first terminal device and the second terminal device are determined to be connected to the same wireless router or the same wireless access point, the processing circuitry determines that the second terminal device is located within the reachable distance from the first terminal device.

Embodiments of the present disclosure disclose a method and an apparatus for controlling an alarm clock. For example, the apparatus includes processing circuitry. The processing circuitry determines an alarm time for the alarm clock of a third wearable device. When a time difference between a present time of the third wearable device and the alarm time is determined to reach a preset duration, the processing circuitry determines whether a fourth wearable device is located within a reachable distance from the third wearable device. When the fourth wearable device is determined to be located within the reachable distance from the third wearable device, the processing circuitry acquires, from the fourth wearable device, a sleep signal indicating sleeping status of a user of the fourth wearable device, and controls the alarm clock and the third wearable device based on the sleep signal.

In some embodiments, when the sleep signal indicates that the user is in a sleep state, the processing circuitry controls the third wearable device to vibrate at the alarm time, and turn off the alarm clock of the third wearable device.

In some embodiments, when the sleep signal indicates that the user is in an awake state, the processing circuitry determines whether one or more additional wearable devices are located within the reachable distance from the third wearable device. When the one or more additional wearable devices are determined to be located within the reachable distance from the third wearable device, the processing circuitry acquires, from the one or more additional wearable devices, one or more additional sleep signals indicating sleeping status of one or more additional users. When the one or more additional sleep signals indicate that each of the one or more additional users is in an awake state, the processing circuitry controls the third wearable device to trigger the alarm clock at the alarm time. When the one or more additional wearable devices are determined not to be located within the reachable distance from the third wearable device, the processing circuitry controls the third wearable device to trigger the alarm clock at the alarm time.

In some embodiments, the processing circuitry determines whether the fourth wearable device is connected to the third wearable device wirelessly using Bluetooth. When the fourth wearable device is determined to be connected to the third wearable device wirelessly using Bluetooth, the processing circuitry determines that the fourth wearable device is located within the reachable distance from the third wearable device.

According to aspects of the disclosure, a non-transitory computer-readable storage medium is provided. The non-transitory computer-readable storage medium stores a program executable by a processor to perform determining an alarm time for the alarm clock of a first terminal device. When a time difference between a present time of the first terminal device and the alarm time is determined to reach a preset duration, the program causes the processor to perform determining whether a second terminal device is located within a reachable distance from the first terminal device. The second terminal device is associated with a first wearable device used by a user. When the second terminal device is determined to be located within the reachable distance from the first terminal device, the program causes the processor to perform acquiring, from the first wearable device, a sleep signal indicating sleeping status of the user. The program also causes the processor to perform controlling the alarm clock and a second wearable device associated with the first terminal device based on the sleep signal.

According to aspects of the disclosure, a non-transitory computer-readable storage medium is provided. The non-transitory computer-readable storage medium stores a program executable by a processor to perform determining an alarm time for the alarm clock of a third wearable device. When a time difference between a present time of the third wearable device and the alarm time is determined to reach a preset duration, the program causes the processor to perform determining whether a fourth wearable device is located within a reachable distance from the third wearable device. When the fourth wearable device is determined to be located within the reachable distance from the third wearable device, the program causes the processor to perform acquiring, from the fourth wearable device, a sleep signal indicating sleeping status of a user of the fourth wearable device. The program causes the processor to perform controlling the alarm clock and the third wearable device based on the sleep signal.

It should be understood that the above general description and subsequent detailed description are merely exemplary and explanatory, rather than a limitation of the present disclosure.

BRIEF DESCRIPTION OF THE DRAWINGS

The accompanying drawings, which are incorporated in and constitute a part of the present specification, illustrate embodiments consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Descriptions will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of devices and methods consistent with aspects related to the disclosure as recited in the appended claims.

Figure 1A:
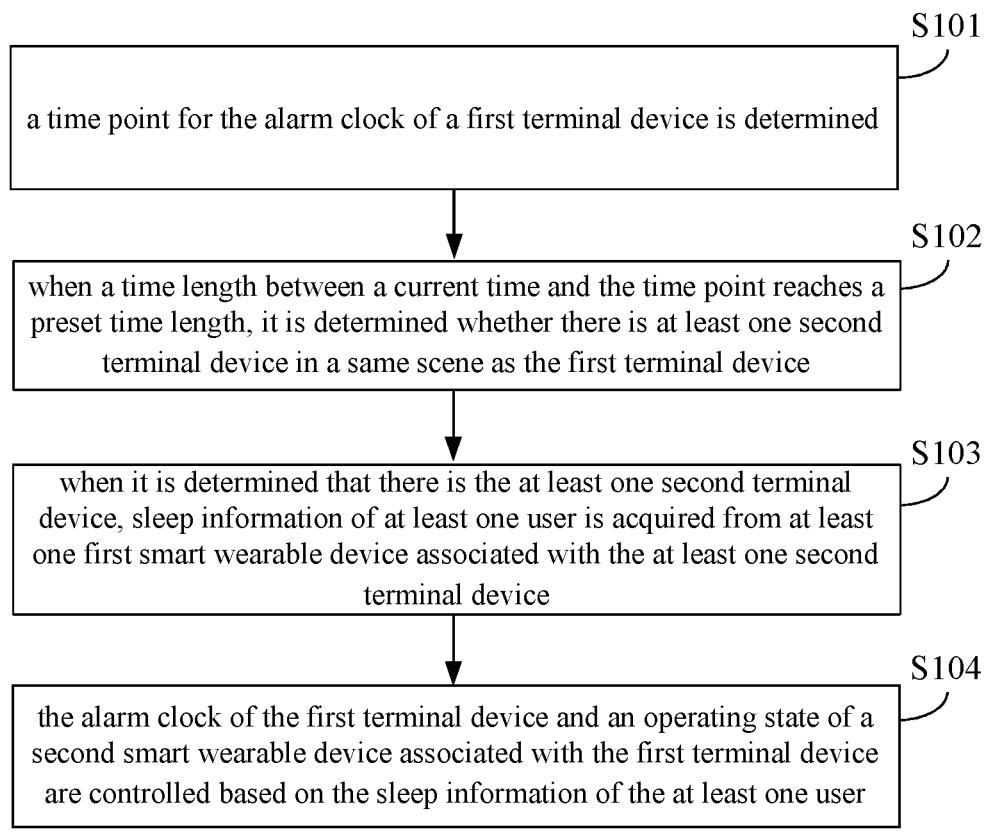
FIG. 1A is a flow chart illustrating a method for controlling an alarm clock according to an exemplary embodiment of the present disclosure.
Figure 1B:
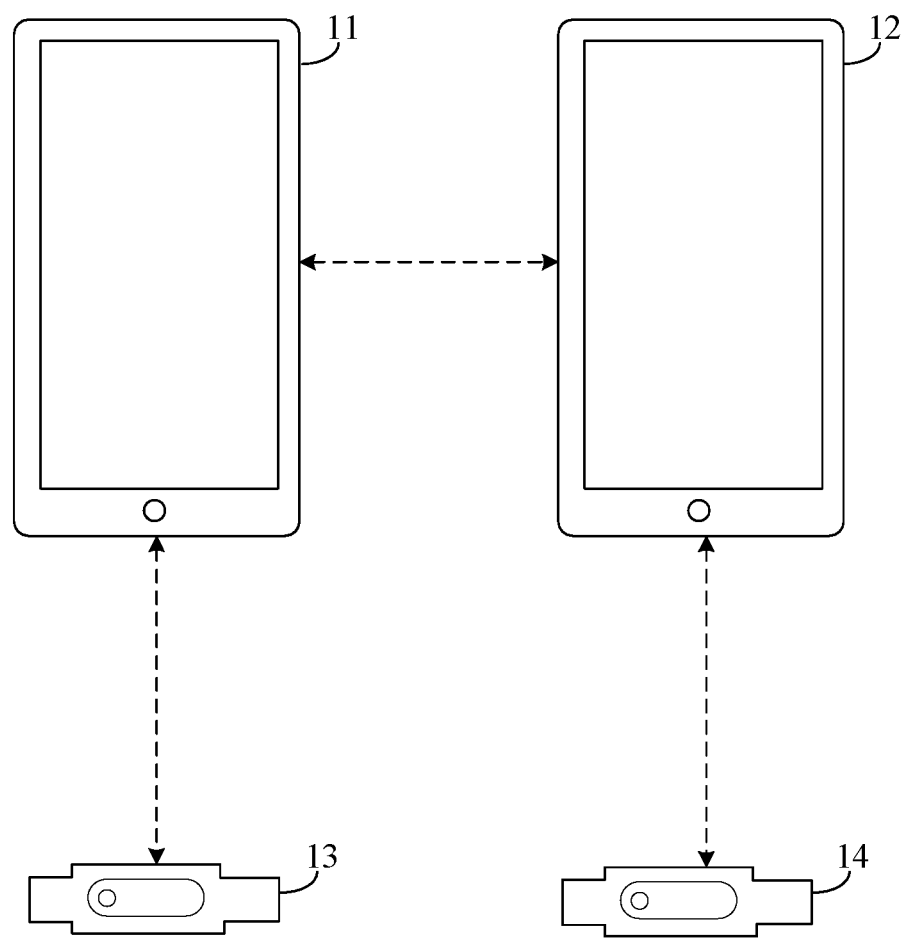
FIG. 1B is a scene diagram of controlling an alarm clock according to an exemplary embodiment of the present disclosure.

FIG. 1A is a flow chart illustrating a method for controlling an alarm clock according to an exemplary embodiment of the present disclosure. FIG. 1B is a scene diagram of controlling an alarm clock according to an exemplary embodiment of the present disclosure. The method for controlling the alarm clock may be applied to a terminal device (e.g., a smart phone, a tablet computer). As shown in FIG. 1A, the method for controlling the alarm clock may include followings steps S101-S104.

At step S101, a time point (or an alarm time) for the alarm clock of a first terminal device is determined.

In this embodiment, the alarm clock is set on a terminal device of the user. The alarm clock is configured to play a ring at a preset time point to, so as to remind a user. In an exemplary embodiment, the user may set the alarm clock for reminding the user to get up at 7:00 in the morning on a first terminal device. Thus, the time point 7:00 is set for the alarm clock.

At step S102, when a time length (or a time difference) between a current time (or a present time) and the time point reaches a preset time length (or a preset duration), it is determined whether there is at least one second terminal device in a same scene as the first terminal device. In some embodiments, when at least one second terminal device is in a same scene as the first terminal device, the at least one second terminal device is located within a reachable distance from the first terminal device.

In this embodiment, when the time length between a current time and the time point set for the alarm clock reaches a preset time length, it is determined whether there is the at least one second terminal device in a same scene as the first terminal device. In the above-mentioned embodiment, if the preset length is 10 minutes, the first terminal device may determine at 6:50 whether there is the at least one second terminal device in a same scene as the first terminal device.

In this embodiment, the first terminal device may determine whether there is the at least one second terminal device in a same scene as the first terminal device in various ways. For example, the first terminal device may determine whether there is the at least one second terminal device connected to the first terminal device via Bluetooth. When it is determined that there is the at least one second terminal device connected to the first terminal device via the Bluetooth, the at least one second terminal device connected to the first terminal device via the Bluetooth is determined as the at least one second terminal device in the same scene as the first terminal device. For another example, when the first terminal device is connected to the at least one second terminal device via WiFi, a WiFi hotspot or a mobile network, at least one distance between the at least one second terminal device and the first terminal device is determined, and it is determined whether there is the at least one second terminal device in the same scene as the first terminal device based on the at least one distance and a preset distance. When a distance between a second terminal device and the first terminal device is smaller than the preset distance, it may be determined that the second terminal device is in the same scene as the first terminal device. For another example, the first terminal device may determine whether there is the at least one second terminal device connected to a same home WiFi network as the first terminal device. When it is determined that there is the at least one second terminal device connected to the same home WiFi network, the at least one second terminal device connected to the same home WiFi network is determined as the at least one second terminal device in the same scene as the first terminal device.

At step S103, when it is determined that there is the at least one second terminal device, sleep information of at least one user is acquired from at least one first smart wearable device (or one first wearable device) associated with the at least one second terminal device. In some embodiments, sleep information is a sleep signal indicating sleeping status of a user.

In an exemplary example, the second terminal device A, the second terminal device B and the first terminal device are in the same scene. The second terminal device A is associated with the first smart wearable device A, the second terminal device B is associated with the first smart wearable device B, the user A wears the first smart wearable device A, and the user B wears the first smart wearable device B. At this step, the first terminal device acquires the sleep information of the user A from the first smart wearable device A via the second terminal device A communicatively connected to the first terminal device, and acquires the sleep information of the user B from the first smart wearable device B via the second terminal device B communicatively connected to the first terminal device. The sleep information may indicate whether the user is in a sleep state.

At step S104, the alarm clock of the first terminal device and an operating state of a second smart wearable device (or a second wearable device) associated with the first terminal device are controlled based on the sleep information of the at least one user.

In an embodiment, when the sleeping information of the at least one user indicates that there is the at least one user is in the sleep state, the first terminal device sends vibration-control information (or a control signal) to the second smart wearable device and turns off the alarm clock, in which the vibration-control information is configured to control the second smart wearable device to vibrate at the time point. When the sleep information of the at least one user indicates that there is no user in a sleep state, the first terminal device is controlled to trigger the alarm clock at the above-mentioned time point. In some embodiments, a user is in an awake state when the user is not in a sleep state.

In the above-mentioned exemplary embodiment, the first terminal device may control the alarm clock and the operating state of the second smart wearable device associated with the first terminal device based on the sleep information of the user A and the sleep information of the user B. For example, when the sleep information of the user A indicates that the user A is in the sleep state, and/or, the sleep information of the user B indicates that the user B is in the sleep state, the first terminal device may turn off the alarm clock, and send the vibration-control information to the second smart wearable device, in which the vibration-control information is configured to control the second smart wearable device to vibrate at the time point for the alarm clock. In this way, it may be avoided that the alarm clock of a single user influences other users in the sleep state. When the sleep information of the user A indicates that the user A is not in the sleep state, and the sleep information of the user B indicates that the user B is not in the sleep state, the first terminal device may be controlled to trigger the alarm clock at the time point for the alarm clock.

As shown in FIG. 1B, in an exemplary scene, the mobile phone 11 of the user 1 is associated with the smart wearable device 13 wore by the user 1, the mobile phone 12 of the user 2 is associated with the smart wearable device 14 wore by the user 2, and the mobile phone 11 is communicatively connected to the mobile phone 12. In this exemplary scene, the mobile phone 11 is communicated and connected with the mobile phone 12 via a same home WIFI network. The alarm clock 11 is set on the mobile phone 11, and the time point corresponding to the alarm clock is 7:00 in the morning. It is also set on the mobile phone 11 that the preset time length is 10 minutes, such that when a time length between a current time and the time point corresponding to the alarm clock reaches the preset time length, the mobile phone 11 is controlled to execute the act of determining whether there is at least one terminal device (e.g., a mobile phone, a PAD and the like) in the same scene as the mobile phone 11. When the mobile phone 11 detects that the current time is 6:50 which satisfies a condition that the time length between the current time and the time point is 10 minutes, the mobile phone 11 may determine that the mobile phone 12 and the mobile phone 11 are in the same scene according to that the mobile phone 11 is connected to the same home WIFI network as the mobile phone 12. After that, the mobile phone 11 sends an instruction for requesting to acquire the sleep information of the user 2 to the mobile phone 12, the mobile phone 12 may feed back the sleep information of the user 2 monitored by the smart wearable device 14 to the mobile phone 11 when receiving the instruction. The mobile phone 11 may control the alarm clock and the operating state of the smart wearable device 13 according to the sleep information of the user 2. When the sleep information of the user 2 indicates that the user 2 is in the sleep state, the mobile phone 11 turns off the alarm clock, and sends the vibration-control information to the smart wearable device 13, in which the vibration-control information is configured to control the smart wearable device 13 to vibrate at 7:00. In this way, it may be avoided that the alarm clock influences a sleeping of the user 2. When the sleep information of the user 2 indicates that the user 2 is not in the sleep state, the mobile phone 11 may trigger the alarm clock at 7:00. In conclusion, the mobile phone 11 may control the alarm clock and the operating state of the smart wearable device 13 flexibly according to the sleep information of the user 2.

In this embodiment, when a time length between a current time and the time point for the alarm clock of the first terminal device reaches a preset time length, and when it is determined that there is a second terminal device in a same scene as the first terminal device, sleep information of a user wearing a first smart wearable device is acquired from the first smart wearable device associated with the second terminal device, and the alarm clock and an operating state of a second smart wearable device associated with the first terminal device are controlled based on the sleep information of the user. In this way, the alarm clock may be controlled flexibly according to the sleep information of the user.

In an embodiment, controlling the alarm clock of the first terminal device and the operating state of the second smart wearable device associated with the first terminal device based on the sleep information of the at least one user may include: when the sleep information of the at least one user indicates that there is the at least one user in a sleep state, sending vibration-control information to the second smart wearable device and turning off the alarm clock, in which the vibration-control information is configured to control the second smart wearable device to vibrate at the time point.

In an embodiment, controlling the alarm clock of the first terminal device and the operating state of the second smart wearable device associated with the first terminal device based on the sleep information of the at least one user may include: when the sleep information of the at least one user indicates that there is no user in a sleep state, controlling the first terminal device to trigger the alarm clock at the time point.

In an embodiment, determining whether there is the at least one second terminal device in the same scene as the first terminal device may include: determining whether there is the at least one second terminal device connected to the first terminal device via Bluetooth; and when it is determined that there is the at least one second terminal device connected to the first terminal device via the Bluetooth, determining the at least one second terminal device connected to the first terminal device via the Bluetooth as the at least one second terminal device in the same scene as the first terminal device.

In an embodiment, determining whether there is the at least one second terminal device in the same scene as the first terminal device may include: when the first terminal device is connected to the at least one second terminal device via WiFi, a WiFi hotspot or a mobile network, determining at least one distance between the at least one second terminal device and the first terminal device; and determining whether there is the at least one second terminal device in the same scene as the first terminal device based on the at least one distance and a preset distance.

In an embodiment, determining whether there is the at least one second terminal device in the same scene as the first terminal device may include: determining whether there is the at least one second terminal device connected to a same home WiFi network as the first terminal device; and when it is determined that there is the at least one second terminal device connected to the same home WiFi network, determining the at least one second terminal device connected to the same home WiFi network as the at least one second terminal device in the same scene as the first terminal device. In some embodiments, the at least one second terminal device connected to a same home WiFi network as the first terminal device includes the at least one second terminal device and the first terminal device connected to a same wireless router or a same wireless access point.

The process of controlling the alarm clock may refer to the following embodiments.

With the above method provided by embodiments of the present disclosure, when a time length between a current time and a time point for an alarm clock of a first terminal device reaches a preset time length, and when it is determined that there is a second terminal device in a same scene as the first terminal device, sleep information of a user wearing a first smart wearable device is acquired from the first smart wearable device associated with the second terminal device, the above-mentioned alarm clock and an operating state of a second smart wearable device associated with the first terminal device are controlled based on the sleep information of the user. In this way, the alarm clock may be controlled flexibly according to the sleeping information of the user.

The technical solution provided by embodiments of the present disclosure may be described with reference to specific embodiments.

Figure 2:
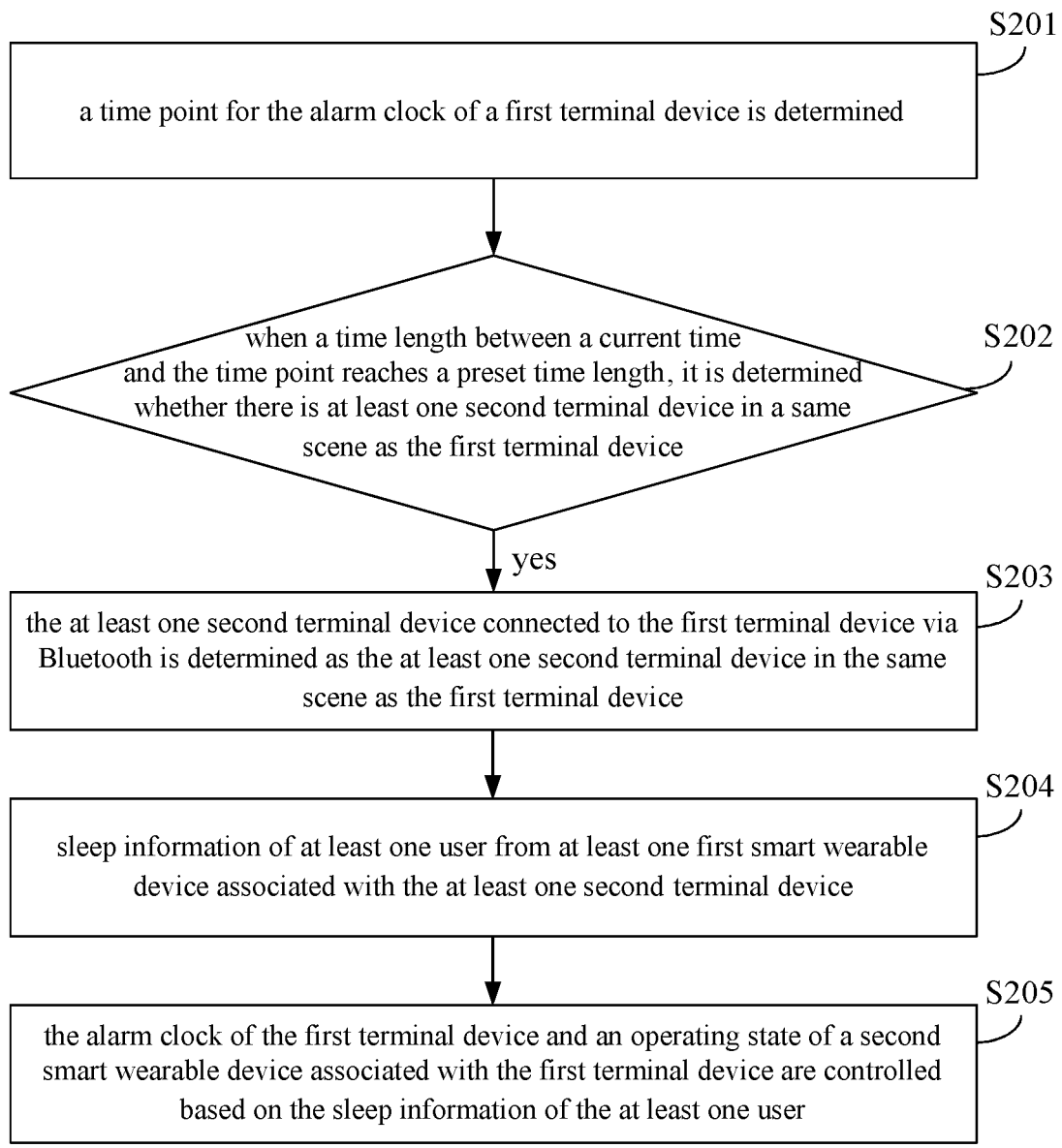
FIG. 2 is a flow chart illustrating a method for controlling an alarm clock according to a first exemplary embodiment of the present disclosure.

FIG. 2 is a flow chart illustrating a method for controlling an alarm clock according to a first exemplary embodiment of the present disclosure. In this embodiment, the above-mentioned method provided by embodiments of the present disclosure is used, and it may be taken as an example that a second terminal device in a same scene as the first terminal device is determined based on an effective distance of a Bluetooth connection. As shown in FIG. 2, following acts are included.

At step S201, a time point for the alarm clock of a first terminal device is determined.

The step S201 in this embodiment is similar to the step S101 in the embodiment illustrated in FIG. 1A, which will not be described in detail herein.

At step S202, when a time length between a current time and the time point reaches a preset time length, it is determined whether there is at least one second terminal device in a same scene as the first terminal device. When it is determined that there is the at least one second terminal device, the step S203 is performed.

At step S203, the at least one second terminal device connected to the first terminal device via Bluetooth is determined as the at least one second terminal device in the same scene as the first terminal device.

In this embodiment, when the time length between the current time and the above-mentioned time point for the first terminal device reaches the preset time length, it may be determined whether there is at least one terminal device connected to the first terminal device via Bluetooth, when it is determined that there is the at least one second terminal device connected to the first terminal device via the Bluetooth, the at least one second terminal device connected to the first terminal device via the Bluetooth is determined as the at least one second terminal device in the same scene as the first terminal device. It may be proved that the first terminal device and the second terminal device are within the effective distance of the Bluetooth when the second terminal device is connected to the first terminal device via the Bluetooth, while the effective distance usually ranges from ten meters to dozens of meters. Therefore, it may be determined that the at least one second terminal device connected to the first terminal device via the Bluetooth is in the same scene as the first terminal device.

At step S204, sleep information of at least one user from at least one first smart wearable device associated with the at least one second terminal device.

At step S205, the alarm clock of the first terminal device and an operating state of a second smart wearable device associated with the first terminal device are controlled based on the sleep information of the at least one user.

The steps S204-S205 in this embodiment are similar to the steps S103-S104 in the embodiment illustrated in FIG. 1A, which will not be described in detail herein.

In this embodiment, it may be determined whether there is the at least one second terminal device in the same scene as the first terminal device by determining whether there is the at least one second terminal device connected to the first terminal device via Bluetooth. The method is simple, easy to be realized, and has a high accuracy.

Figure 3:
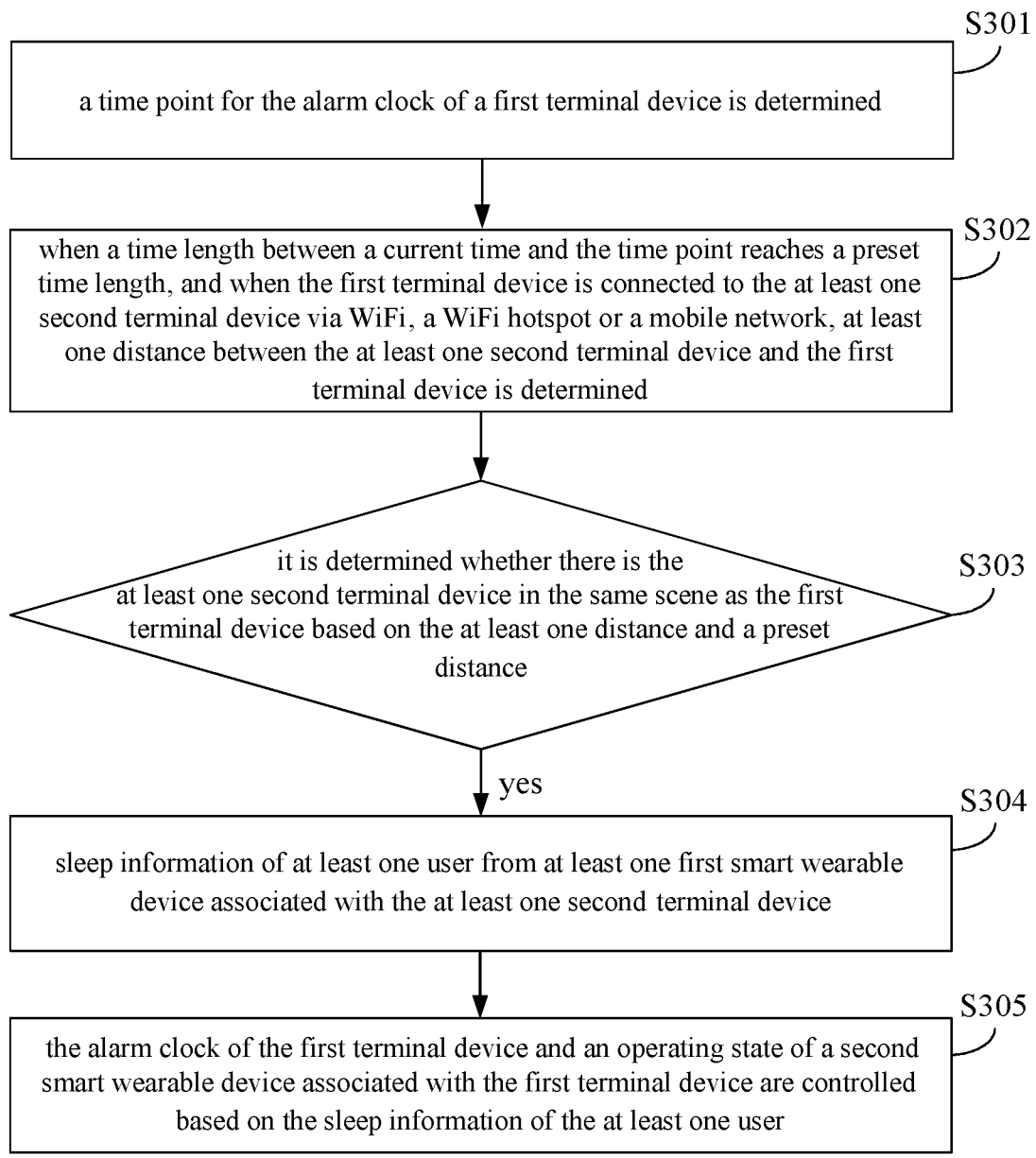
FIG. 3 is a flow chart illustrating a method for controlling an alarm clock according to a second exemplary embodiment of the present disclosure.

FIG. 3 is a flow chart illustrating a method for controlling an alarm clock according to a second exemplary embodiment of the present disclosure. In this embodiment, the above-mentioned method provided by the embodiments of the present disclosure is used, and it may be taken as an example that a second terminal device in a same scene as the first terminal device is determined based on a distance between the mobile terminals and a preset distance. As shown in FIG. 3, following acts are included.

At step S301, a time point for the alarm clock of a first terminal device is determined.

The step S301 in this embodiment is similar to the step S101 in the embodiment illustrated in FIG. 1A, which will not be described in detail herein.

At step S302, when a time length between a current time and the time point reaches a preset time length, and when the first terminal device is connected to the at least one second terminal device via WiFi, a WiFi hotspot or a mobile network, at least one distance between the at least one second terminal device and the first terminal device is determined.

At step S303, it is determined whether there is the at least one second terminal device in the same scene as the first terminal device based on the at least one distance and a preset distance. When it is determined that there is the at least one second terminal device in the same scene as the first terminal device based on the at least one distance and a preset distance, step S304 is performed.

In this embodiment, when determining whether there is the at least one second terminal device in the same scene as the first terminal device, a distance between the first terminal device and the second terminal device connected to the first terminal via WiFi, a WiFi hotspot or a mobile network is determined firstly, and then it may be determined whether there is the second terminal device in the same scene as the first terminal device based on the distance between the first terminal device and the second terminal device and the preset distance. When the distance between the first terminal device and the second terminal device is smaller than the preset distance, it is determined that the second terminal is in the same scene as the first terminal device.

In an exemplary embodiment, the second terminal device A, the second terminal device B and the first terminal device are connected via WIFI. When the first terminal device determines whether there is the at least one second terminal device in the same scene as the first terminal device, a satellite positioning (e.g., GPS positioning) is used to determine a position of the first terminal device, a position of the second terminal device A and a position of the second terminal device B. After that, a first distance between the position of the first terminal device and the second terminal device A and a second distance between the position of the first terminal device and the second terminal device B are determined according to the position of the first terminal device, the position of the second terminal device A and the position of the second terminal device B. Then, the first distance and the second distance are compared with the preset distance respectively. When the first distance is smaller than the preset distance, it is determined that the second terminal device A is in the same scene as the first terminal device, and when the second distance is smaller than the preset distance, it is determined that the second terminal device B is in the same scene as the first terminal device. Generally, when a distance between two terminal devices is smaller than a certain distance, it may be determined that the two mobile terminal are in the same scene. It may be determined whether there is the at least one second terminal device in the same scene as the first terminal device by comparing the distance between the devices and the preset distance, which has a high accuracy.

At step S304, sleep information of at least one user from at least one first smart wearable device associated with the at least one second terminal device.

At step S305, the alarm clock of the first terminal device and an operating state of a second smart wearable device associated with the first terminal device are controlled based on the sleep information of the at least one user.

The steps S304-S305 in this embodiment are similar to the steps S103-S104 in the embodiment illustrated in FIG. 1A, which will not be described in detail herein.

In this embodiment, it may be determined whether there is the at least one second terminal device in the same scene as the first terminal device by determining a relation between the distance between the terminal devices and the preset distance, which has a high accuracy.

Figure 4:
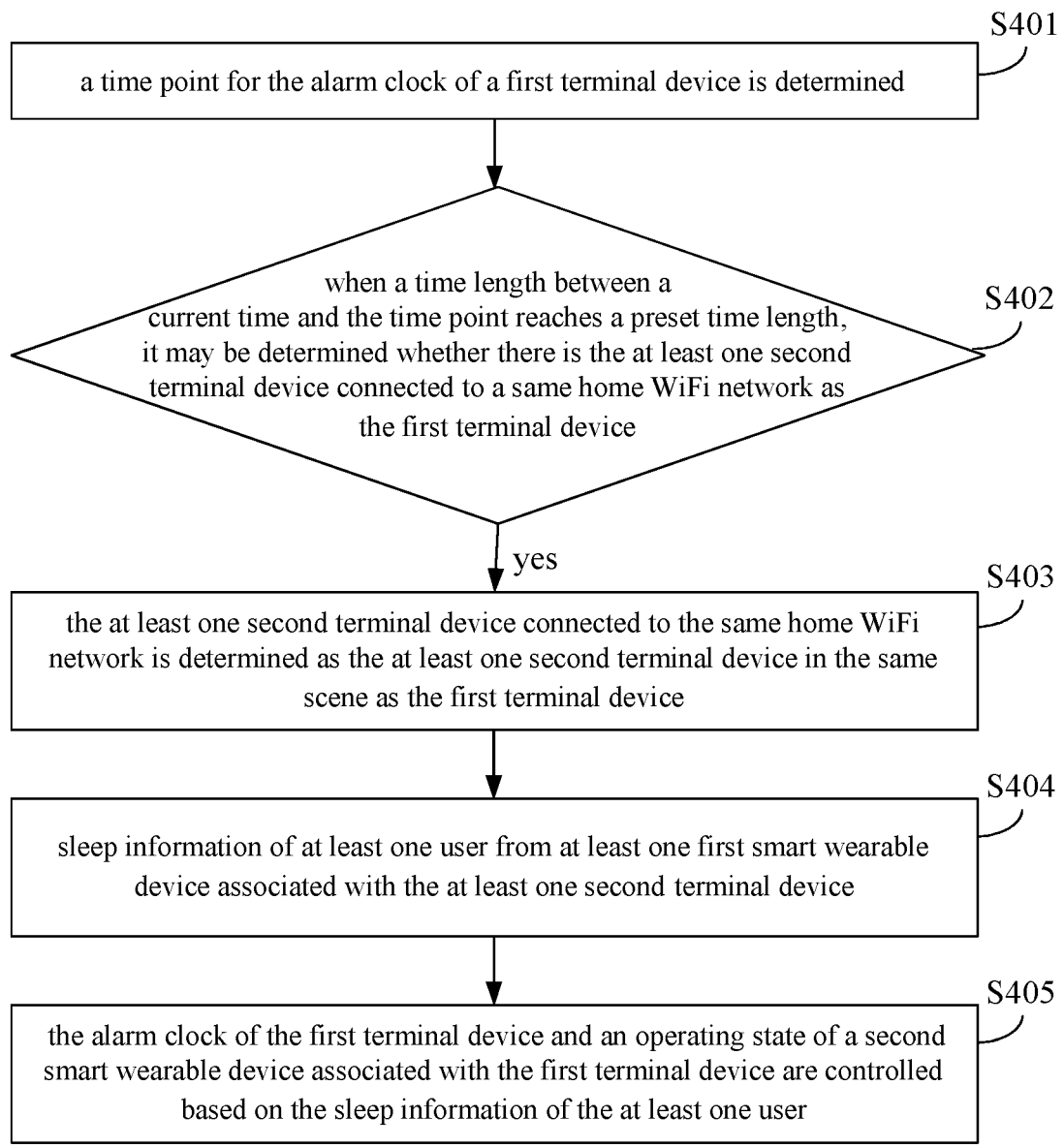
FIG. 4 is a flow chart illustrating a method for controlling an alarm clock according to a third exemplary embodiment of the present disclosure.

FIG. 4 is a flow chart illustrating a method for controlling an alarm clock according to a third exemplary embodiment of the present disclosure. In this embodiment, the above-mentioned method provided by embodiments of the present disclosure is used, and it may be taken as an example that a second terminal device in a same scene as the first terminal device is determined by determining whether the second terminal device is connected a same home WIFI as the first terminal device. As shown in FIG. 4, following acts are included.

At step S401, a time point for the alarm clock of a first terminal device is determined.

The step S401 in this embodiment is similar to the step S101 in the embodiment illustrated in FIG. 1A, which will not be described in detail herein.

At step S402, when a time length between a current time and the time point reaches a preset time length, it may be determined whether there is the at least one second terminal device connected to a same home WiFi network as the first terminal device, and when it is determined that there is the at least one second terminal device connected to the same home WiFi network, step S403 is performed.

At step S403, the at least one second terminal device connected to the same home WiFi network is determined as the at least one second terminal device in the same scene as the first terminal device.

In this embodiment, when determining whether there is the at least one second terminal device in the same scene as the first terminal device, the first terminal device may determine whether there is a second terminal device connected to the same home WIFI as the first terminal, and when it is determined that there is the second terminal device connected to the same home WiFi network as the first terminal device, the at least one second terminal device connected to the same home WiFi network is determined as the at least one second terminal device in the same scene as the first terminal device.

In an exemplary embodiment, the first terminal device may determine whether the connected network belongs to the home WIFI network by determining a model number of a router.

In an exemplary embodiment, the first terminal device is connected to a router of which the model number is AAAA. When the first terminal device determines that the second terminal device A and the second terminal device B are also connected to the router, it is determined whether the above-mentioned router belongs to a home router according to the model number of the router. When it is determined that the above-mentioned router belongs to the home router, it is determined that the second terminal device A, the second terminal device B and the first terminal device are connected to a same home WIFI network.

At step S404, sleep information of at least one user from at least one first smart wearable device associated with the at least one second terminal device.

At step S405, the alarm clock of the first terminal device and an operating state of a second smart wearable device associated with the first terminal device are controlled based on the sleep information of the at least one user.

The steps S404~S405 in this embodiment are similar to the steps S103~S104 in the embodiment illustrated in FIG. 1A, which will not be described in detail herein.

In this embodiment, it may be determined whether there is the at least one second terminal device in the same scene as the first terminal device by determining whether the at least one second terminal device is connected to a same home WIFI as the first terminal device, which has a high accuracy and an enhanced practical application.

Figure 5A:
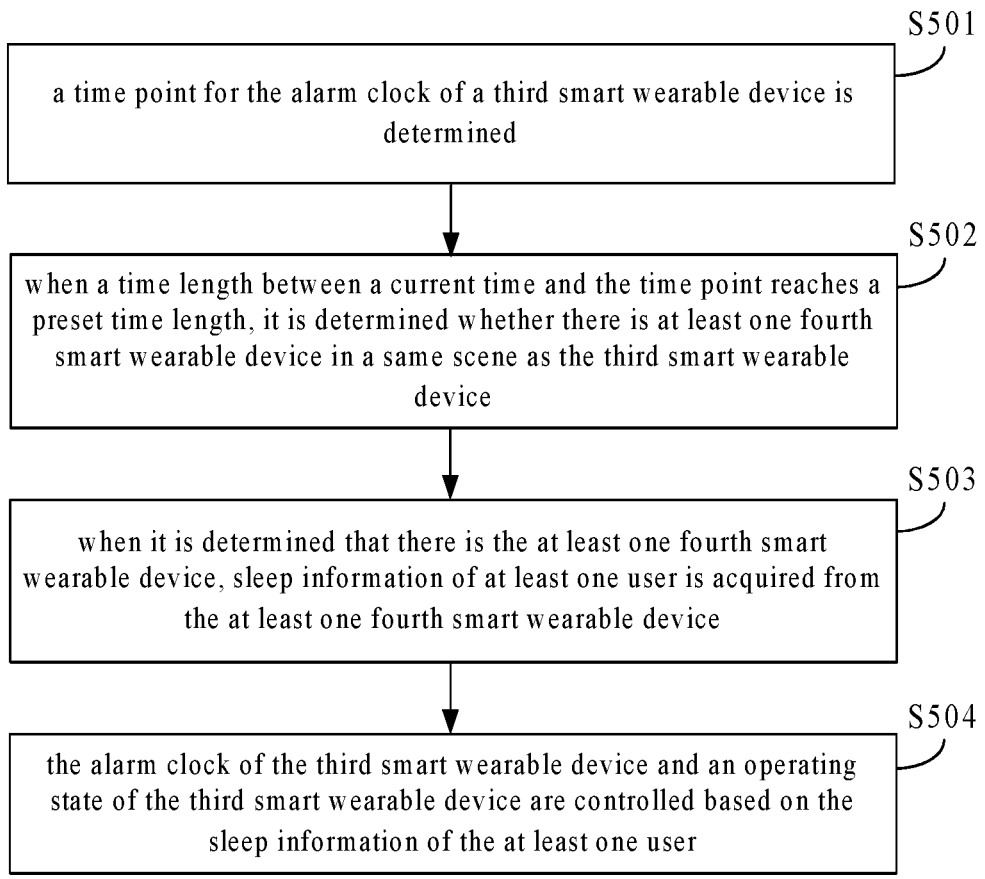
FIG. 5A is a flow chart illustrating a method for controlling an alarm clock according to an exemplary embodiment of the present disclosure.
Figure 5B:
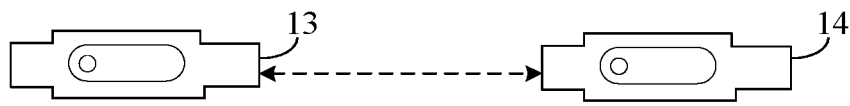
FIG. 5B is a scene diagram of controlling an alarm clock according to an exemplary embodiment of the present disclosure.

FIG. 5A is a flow chart illustrating a method for controlling an alarm clock according to an exemplary embodiment of the present disclosure. FIG. 5B is a scene diagram of controlling an alarm clock according to an exemplary embodiment of the present disclosure. The method for controlling the alarm clock may be applied to a terminal device (e.g., a smart phone, a tablet computer). As shown in FIG. 5A, the method for controlling the alarm clock may include followings steps S501-S504.

At step S501, a time point for the alarm clock of a third smart wearable device (or a third wearable device) is determined.

In this embodiment, the alarm clock is set on a terminal device of the user. The alarm clock is configured to play a ring at a preset time point to, so as to remind a user. In an exemplary embodiment, the user may set the alarm clock for reminding the user to get up at 7:00 in the morning on a third smart wearable device. Thus, the time point 7:00 is set for the alarm clock.

At step S502, when a time length between a current time and the time point reaches a preset time length, it is determined whether there is at least one fourth smart wearable device (or fourth wearable device) in a same scene as the third smart wearable device.

In this embodiment, when the time length between a current time and the time point set for the alarm clock reaches a preset time length, it is determined whether there is the at least one fourth smart wearable device in a same scene as the third smart wearable device. In the above-mentioned embodiment, if the preset length is 10 minutes, the third smart wearable device may determine at 6:50 whether there is the at least one fourth smart wearable device in a same scene as the third smart wearable device.

In this embodiment, when the third smart wearable device determines whether there is the at least one fourth smart wearable device in a same scene as the third smart wearable device, the third smart wearable device may determine whether there is the at least one fourth smart wearable device connected to the third smart wearable device via Bluetooth. When it is determined that there is the at least one fourth smart wearable device connected to the third smart wearable device via the Bluetooth, the at least one fourth smart wearable device connected to the third smart wearable device via the Bluetooth is determined as the at least one fourth smart wearable device in the same scene as the third smart wearable device.

At step S503, when it is determined that there is the at least one fourth smart wearable device, sleep information of at least one user is acquired from the at least one fourth smart wearable device.

In an exemplary example, the fourth smart wearable device A, the fourth smart wearable device B and the third smart wearable device are in the same scene. A user A wears the fourth smart wearable device A, a user B wears the fourth smart wearable device B, and a user C wears the third smart wearable device. At this step, the third smart wearable device acquires the sleep information of the user A via the fourth smart wearable device A communicatively connected to the third smart wearable device, and acquires the sleep information of the user B via the fourth smart wearable device B communicatively connected to the third smart wearable device.

At step S504, the alarm clock of the third smart wearable device and an operating state of the third smart wearable device are controlled based on the sleep information of the at least one user.

In an embodiment, when the sleeping information of the at least one user indicates that there is the at least one user is in the sleep state, the alarm clock is turned off, and the third smart wearable device is controlled to vibrate at the above-mentioned time point. When the sleep information of the at least one user indicates that there is no user in a sleep state, the third smart wearable device is controlled to trigger the alarm clock at the above-mentioned time point.

In the above-mentioned exemplary embodiment, the third smart wearable device may control the alarm clock and the operating state of the third smart wearable device based on the sleep information of the user A and the sleep information of the user B. For example, when the sleep information of the user A indicates that the user A is in the sleep state, and/or, the sleep information of the user B indicates that the user B is in the sleep state, the third smart wearable device may turn off the alarm clock, and the third smart wearable device is controlled to vibrate at the above-mentioned time point. In this way, it may be avoided that the alarm clock of the third smart wearable device (set by the user C) influences the user A and user B in the sleep state. When the sleep information of the user A indicates that the user A is not in the sleep state, and the sleep information of the user B indicates that the user B is not in the sleep state, the third smart wearable device may be controlled to trigger the alarm clock at the above-mentioned time point.

As shown in FIG. 5B, in an exemplary scene, the smart wearable device 13 is communicatively connected to the smart wearable device 14 via Bluetooth, the smart wearable device 13 is wore by the user 1, the smart wearable device 14 is wore by the user 2. The alarm clock is set on the smart wearable device 13, and the time point corresponding to the alarm clock is 7:00 in the morning. It is also set on the smart wearable device 13 that the preset time length is 10 minutes, such that when a time length between a current time and the time point corresponding to the alarm clock reaches the preset time length, the smart wearable device 13 is controlled to execute the act of determining whether there is at least one smart wearable device in the same scene as the smart wearable device 13. When the smart wearable device detects that the current time is 6:50 which satisfies a condition that the time length between the current time and 7:00 is 10 minutes, the smart wearable device 13 may determine that the smart wearable device 14 is in the same scene as the smart wearable device 13 according to that "the smart wearable device 13 is communicatively connected to the smart wearable device 14 via Bluetooth". After that, the smart wearable device 13 sends an instruction for requesting to acquire the sleep information of the user 2 to the smart wearable device 14, the smart wearable device 14 may feed back the sleep information of the user 2 monitored by the smart wearable device 14 to the smart wearable device 13 when receiving the instruction. The smart wearable device 13 may control the alarm clock and the operating state of the smart wearable device 13 according to the sleep information of the user 2. When the sleep information of the user 2 indicates that the user 2 is in the sleep state, the smart wearable device 13 turns off the alarm clock, and the smart wearable device 13 is controlled to vibrate at 7:00, in which the vibration-control information is configured to control the smart wearable device 13 to vibrate at 7:00. In this way, it may be avoided that the alarm clock influences a sleeping of the user 2. When the sleep information of the user 2 indicates that the user 2 is not in the sleep state, the smart wearable device 13 may trigger the alarm clock at 7:00. In conclusion, the smart wearable device 13 may control the alarm clock and the operating state of the smart wearable device 13 flexibly according to the sleep information of the user 2.

In this embodiment, when a time length between a current time and the time point for the alarm clock of the third smart wearable device reaches a preset time length, and when it is determined that there is a fourth smart wearable device in a same scene as the third smart wearable device, the third smart wearable device may acquires sleep information of a user wearing the fourth smart wearable device, and the alarm clock and an operating state of the third smart wearable device are controlled based on the sleep information of the user. In this way, the alarm clock may be controlled flexibly according to the sleep information of the user.

In an embodiment, controlling the alarm clock of the third smart wearable device and the operating state of the third smart wearable device based on the sleep information of the at least one user may include: when the sleep information of the at least one user indicates that there is the at least one user in a sleep state, turning off the alarm clock and controlling the third smart wearable device to vibrate at the time point.

In an embodiment, controlling the alarm clock of the third smart wearable device and the operating state of the third smart wearable device based on the sleep information of the at least one user may include: when the sleep information of the at least one user indicates that there is no user in a sleep state, controlling the third smart wearable device to trigger the alarm clock at the time point.

In an embodiment, determining whether there is the at least one fourth smart wearable device in the same scene as the third smart wearable device may include: determining whether there is the at least one fourth smart wearable device connected to the third smart wearable device via Bluetooth; and when it is determined that there is the at least one fourth smart wearable device connected to the third smart wearable device via the Bluetooth, determining the at least one fourth smart wearable device connected to the third smart wearable device via the Bluetooth as the at least one fourth smart wearable device in the same scene as the third smart wearable device.

The process of controlling the alarm clock may refer to the following embodiments.

With the above method provided by embodiments of the present disclosure, when a time length between a current time and a time point for an alarm clock of a third smart wearable device reaches a preset time length, and when it is determined that there is a fourth smart wearable device in a same scene as the third smart wearable device, the third smart wearable device acquires sleep information of a user wearing the fourth smart wearable device, and controls the alarm clock and an operating state of the third smart wearable device based on the sleep information of the user. In this way, the alarm clock may be controlled flexibly according to the sleeping information of the user.

The technical solution provided by embodiments of the present disclosure may be described with reference to specific embodiments.

Figure 6:
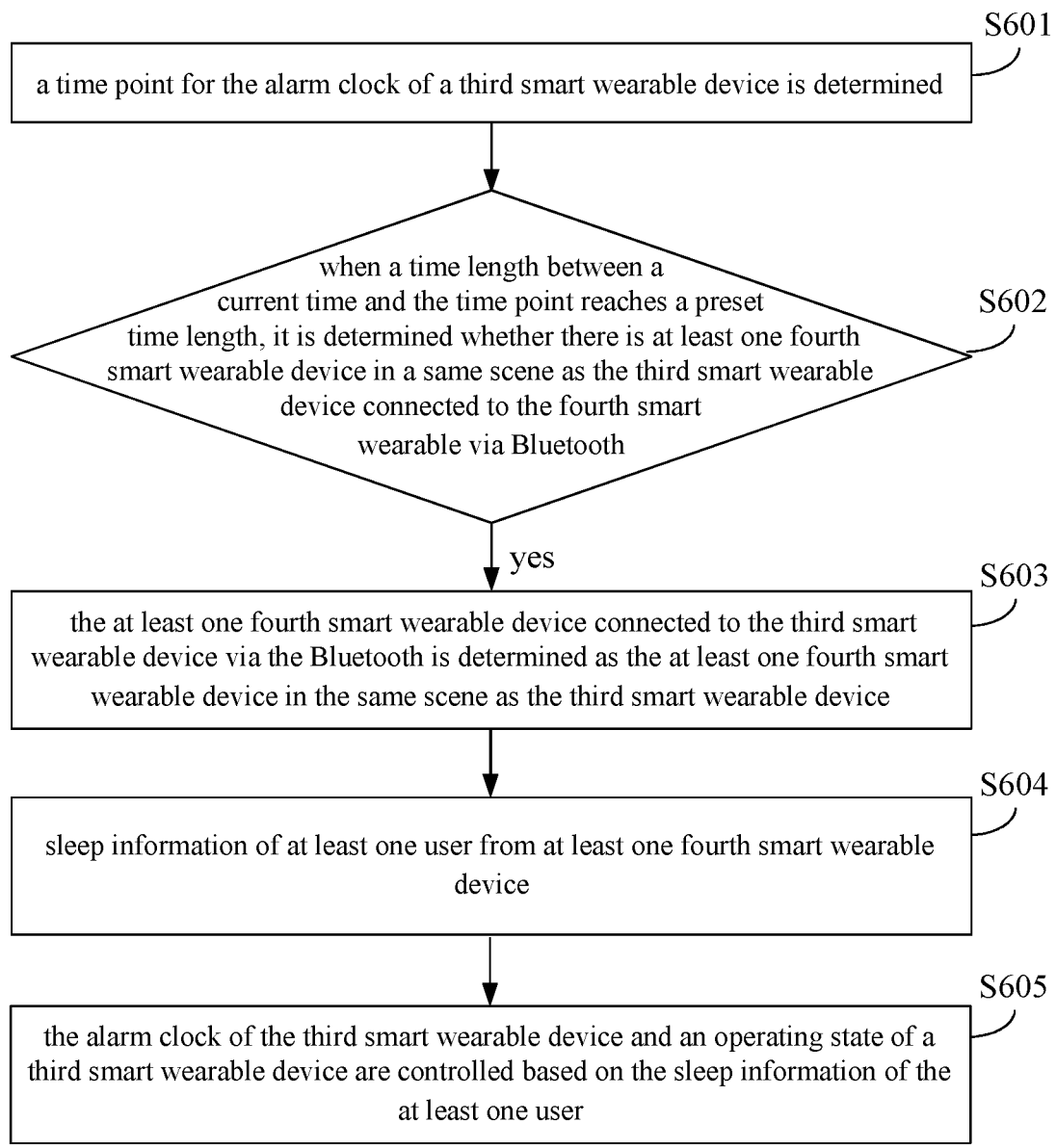
FIG. 6 is a flow chart illustrating a method for controlling an alarm clock according to a fourth exemplary embodiment of the present disclosure.

FIG. 6 is a flow chart illustrating a method for controlling an alarm clock according to a fourth exemplary embodiment of the present disclosure. In this embodiment, the above-mentioned method provided by embodiments of the present disclosure is used, and it may be taken as an example that a fourth smart wearable device in a same scene as the third smart wearable device is determined based on an effective distance of a Bluetooth connection. As shown in FIG. 6, following acts are included.

At step S601, a time point for the alarm clock of a third smart wearable device is determined.

The step S601 in this embodiment is similar to the step S501 in the embodiment illustrated in FIG. 5A, which will not be described in detail herein.

At step S602, when a time length between a current time and the time point reaches a preset time length, it is determined whether there is at least one fourth smart wearable device in a same scene as the third smart wearable device connected to the fourth smart wearable via Bluetooth. When it is determined that there is the at least one fourth smart wearable device, the step S603 is performed.

At step S603, the at least one fourth smart wearable device connected to the third smart wearable device via the Bluetooth is determined as the at least one fourth smart wearable device in the same scene as the third smart wearable device.

In this embodiment, when the time length between the current time and the above-mentioned time point for the third smart wearable device reaches the preset time length, it may be determined whether there is at least one fourth smart wearable device connected to the third smart wearable device via the Bluetooth, when it is determined that there is the at least one fourth smart wearable device connected to the third smart wearable device via the Bluetooth, the at least one fourth smart wearable device connected to the third smart wearable device via the Bluetooth is determined as the at least one fourth smart wearable device in the same scene as the third smart wearable device. It may be proved that the third smart wearable device and the fourth smart wearable device are within the effective distance of the Bluetooth when the fourth smart wearable device is connected to the third smart wearable device via the Bluetooth, while the effective distance usually ranges from ten meters to dozens of meters. Therefore, it may be determined that the at least one fourth smart wearable device connected to the third smart wearable device via the Bluetooth is in the same scene as the third smart wearable device.

At step S604, sleep information of at least one user from at least one fourth smart wearable device.

At step S605, the alarm clock of the third smart wearable device and an operating state of a third smart wearable device are controlled based on the sleep information of the at least one user.

The steps S604~S605 in this embodiment are similar to the steps S503~S504 in the embodiment illustrated in FIG. 5A, which will not be described in detail herein.

In this embodiment, it may be determined whether there is the at least one fourth smart wearable device in the same scene as the third smart wearable device by determining whether there is the at least one fourth smart wearable device connected to the third smart wearable device via the Bluetooth. The method is simple, easy to be realized, and has a high accuracy.

Figure 7A:
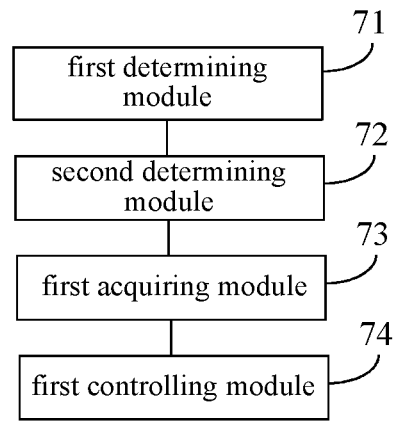
FIG. 7A is a block diagram of an apparatus for controlling an alarm clock according to an exemplary embodiment of the present disclosure.

FIG. 7A is a block diagram of an apparatus for controlling an alarm clock according to an exemplary embodiment of the present disclosure. As shown in FIG. 7A, the apparatus for controlling the alarm clock may include a first determining module 71, a second determining module 72, a first acquiring module 73 and a first controlling module 74.

The first determining module 71 is configured to determine a time point for the alarm clock of a first terminal device.

The second determining module 72 is configured to determine whether there is at least one second terminal device in a same scene as the first terminal device when a time length between a current time and the time point reaches a preset time length.

The first acquiring module 73 is configured to acquire sleep information of at least one user from at least one first smart wearable device associated with the at least one second terminal device when it is determined that there is the at least one second terminal device.

The first controlling module 74 is configured to control the alarm clock of the first terminal device and an operating state of a second smart wearable device associated with the first terminal device based on the sleep information of the at least one user.

Figure 7B:
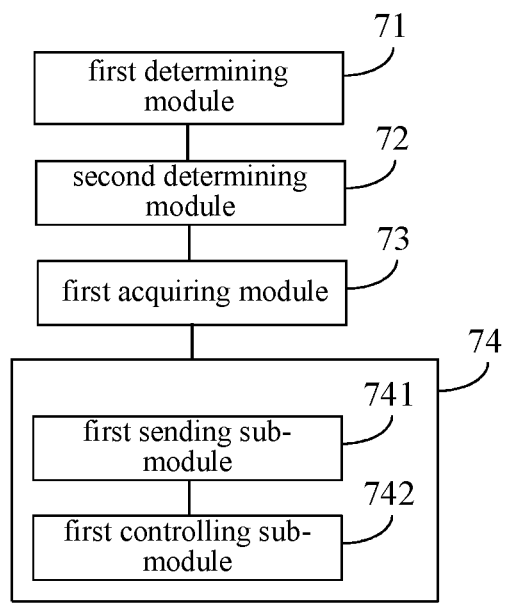
FIG. 7B is a block diagram of an apparatus for controlling an alarm clock according to another exemplary embodiment of the present disclosure.

As shown in FIG. 7B, in an exemplary embodiment, the first controlling module 74 may include: a first sending sub-module 741 and a first controlling sub-module 742.

The first sending sub-module 741 is configured to send vibration-control information to the second smart wearable device when the sleep information of the at least one user indicates that there is the at least one user in a sleep state, in which the vibration-control information is configured to control the second smart wearable device to vibrate at the time point.

The first controlling sub-module 742 is configured to turn off the alarm clock.

In an exemplary embodiment, when the sleep information of the at least one user indicates that there is no user in a sleep state, the first controlling module is configured to control the first terminal device to trigger the alarm clock at the time point.

Figure 7C:
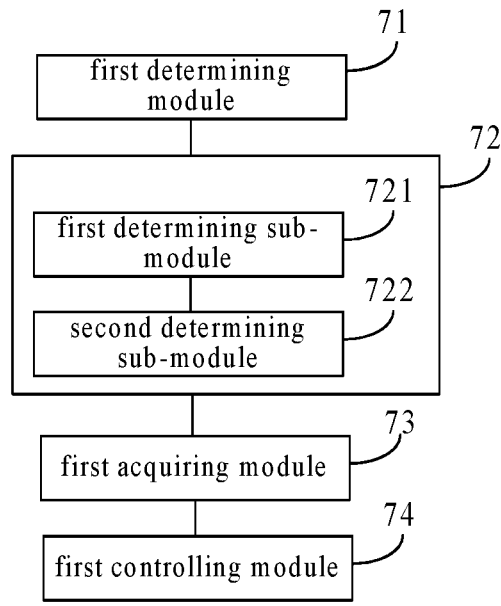
FIG. 7C is a block diagram of an apparatus for controlling an alarm clock according to yet another exemplary embodiment of the present disclosure.

As shown in FIG. 7C, in an exemplary embodiment, the second determining module 72 may include: a first determining sub-module 721 and a second determining sub-module 722.

The first determining sub-module 721 is configured to determine whether there is the at least one second terminal device connected to the first terminal device via Bluetooth.

The second determining sub-module 722 is configured to determine the at least one second terminal device connected to the first terminal device via the Bluetooth as the at least one second terminal device in the same scene as the first terminal device.

Figure 7D:
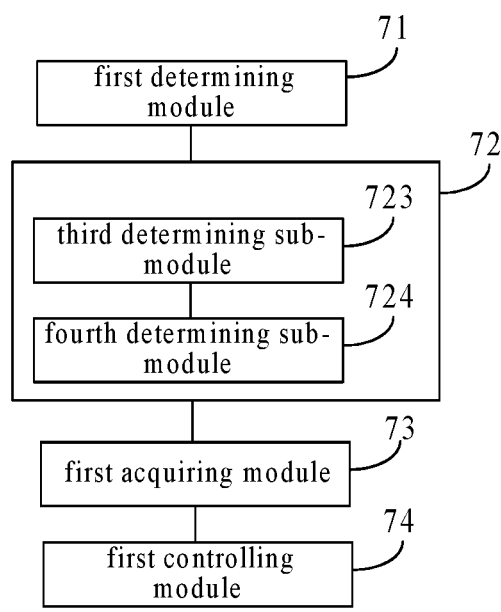
FIG. 7D is a block diagram of an apparatus for controlling an alarm clock according to still another exemplary embodiment of the present disclosure.

As shown in FIG. 7D, in an exemplary embodiment, the second determining module 72 may include: a third determining sub-module 723 and a fourth determining sub-module 724.

The third determining sub-module 723 is configured to determine at least one distance between the at least one second terminal device and the first terminal device when the first terminal device is connected to the at least one second terminal device via WiFi, a WiFi hotspot or a mobile network.

The fourth determining sub-module 724 is configured to determine whether there is the at least one second terminal device in the same scene as the first terminal device based on the at least one distance and a preset distance.

Figure 7E:
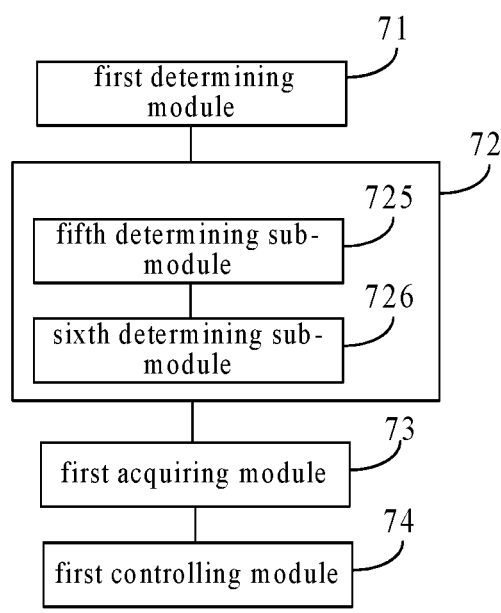
FIG. 7E is a block diagram of an apparatus for controlling an alarm clock according to yet still another exemplary embodiment of the present disclosure.

As shown in FIG. 7E, in an exemplary embodiment, the second determining module 72 may include: a fifth determining sub-module 725 and a sixth determining sub-module 726.

The fifth determining sub-module 725 is configured to determine whether there is the at least one second terminal device connected to a same home WiFi network as the first terminal device.

The sixth determining sub-module 726 is configured to determine the at least one second terminal device connected to the same home WiFi network as the at least one second terminal device in the same scene as the first terminal device.

Figure 8A:
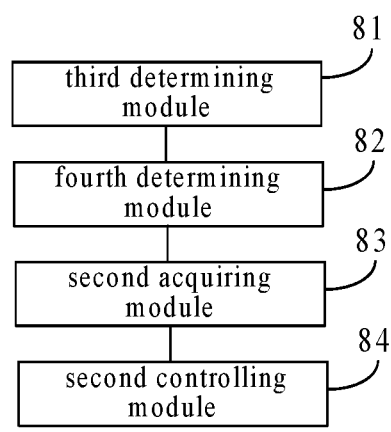
FIG. 8A is a block diagram of an apparatus for controlling an alarm clock according to an exemplary embodiment of the present disclosure.

FIG. 8A is a block diagram of an apparatus for controlling an alarm clock according to an exemplary embodiment of the present disclosure. As shown in FIG. 8A, the apparatus for controlling the alarm clock may include a third determining module 81, a fourth determining module 82, a second acquiring module 83 and a second controlling module 84.

The third determining module 81 is configured to determine a time point for the alarm clock of a third smart wearable device.

The fourth determining module 82 is configured to determine whether there is at least one fourth smart wearable device in a same scene as the third smart wearable device when a time length between a current time and the time point reaches a preset time length.

The second acquiring module 83 is configured to acquire sleep information of at least one user from the at least one fourth smart wearable device when it is determined that there is the at least one fourth smart wearable device.

The second controlling module 84 is configured to control the alarm clock of the third smart wearable device and an operating state of the third smart wearable device based on the sleep information of the at least one user.

In an exemplary embodiment, when the sleep information of the at least one user indicates that there is the at least one user in a sleep state, the second controlling module 84 is configured to turn off the alarm clock and to control the third smart wearable device to vibrate at the time point.

In an exemplary embodiment, when the sleep information of the at least one user indicates that there is no user in a sleep state, the second controlling module 84 is configured to control the third smart wearable device to trigger the alarm clock at the time point.

Figure 8B:
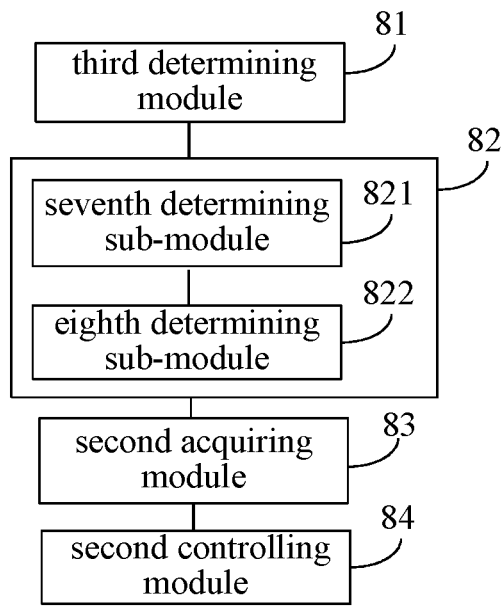
FIG. 8B is a block diagram of an apparatus for controlling an alarm clock according to another exemplary embodiment of the present disclosure.

As shown in FIG. 8B, in an exemplary embodiment, the fourth determining module 82 may include: a seventh determining sub-module 821 and an eighth determining sub-module 822.

The seventh determining sub-module 821 is configured to determine whether there is the at least one fourth smart wearable device connected to the third smart wearable device via Bluetooth.

The eighth determining sub-module 822 is configured to determine the at least one fourth smart wearable device connected to the third smart wearable device via the Bluetooth as the at least one fourth smart wearable device in the same scene as the third smart wearable device.

Regarding the apparatus in the above-embodiment, specific manners for perform operations of each module have been described in detail in embodiments related to the method, which will not be described in detail herein.

Figure 9:
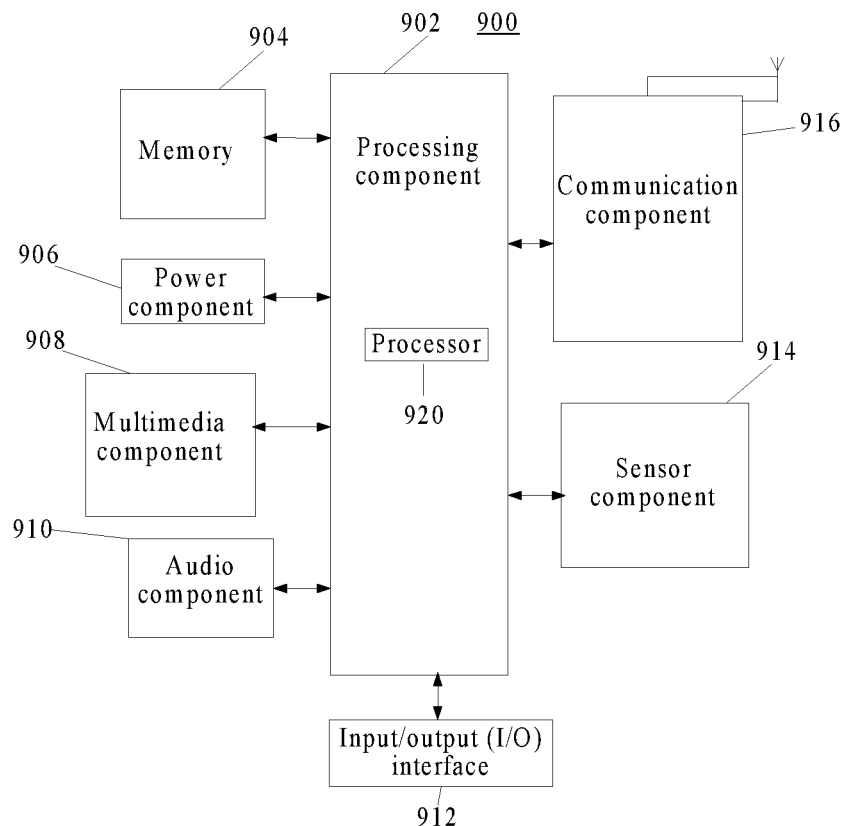
FIG. 9 is a block diagram illustrating a device for controlling an alarm clock according to an exemplary embodiment of the present disclosure.

FIG. 9 is a block diagram illustrating a device for controlling an alarm clock according to an exemplary embodiment of the present disclosure. For example, the device 900 may be a mobile phone, a computer, a digital broadcast terminal, a message transmitting-receiving device, a game control panel, a tablet device, a medical device, a fitness device, a personal digital assistant and the like.

Referring to FIG. 9, the device 900 may include one or more of the following components: a processing component 902, a memory 904, a power component 906, a multimedia component 908, an audio component 910, an input/output (I/O) interface 912, a sensor component 914, and a communication component 916.

The processing component 902 typically controls overall operations of the device 900, such as the operations associated with display, telephone calls, data communications, camera operations, and recording operations. The processing component 902 may include one or more processors 620 to execute instructions to perform all or part of the steps in the above described methods. Moreover, the processing component 902 may include one or more modules which facilitate the interaction between the processing component 902 and other components. For instance, the processing component 902 may include a multimedia module to facilitate the interaction between the multimedia component 908 and the processing component 902.

The memory 904 is configured to store various types of data to support the operation of the device 900. Examples of such data include instructions for any applications or methods operated on the device 900, contact data, phonebook data, messages, pictures, video, etc. The memory 904 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 906 provides power to various components of the device 900. The power component 906 may include a power management system, one or more power sources, and any other components associated with the generation, management, and distribution of power in the device 900.

The multimedia component 908 includes a screen providing an output interface between the device 900 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 908 includes a front camera and/or a rear camera. The front camera and the rear camera may receive an external multimedia datum while the device 900 is in an operation mode, such as a photographing mode or a video mode. Each of the front camera and the rear camera may be a fixed optical lens system or have focus and optical zoom capability.

The audio component 910 is configured to output and/or input audio signals. For example, the audio component 910 includes a microphone ("MIC") configured to receive an external audio signal when the device 900 is in an operation mode, such as a call mode, a recording mode, and a voice recognition mode. The received audio signal may be further stored in the memory 904 or transmitted via the communication component 916. In some embodiments, the audio component 910 further includes a speaker to output audio signals.

The I/O interface 912 provides an interface between the processing component 902 and peripheral interface modules, such as a keyboard, a click wheel, buttons, and the like. The buttons may include, but are not limited to, a home button, a volume button, a starting button, and a locking button.

The sensor component 914 includes one or more sensors to provide status assessments of various aspects of the device 900. For instance, the sensor component 914 may detect a temperature of the environment surrounding the device 900 and water temperature. The sensor component 914 may also detect a change in position of the device 900 or a component of the device 900, a presence or absence of user contact with the device 900, an orientation or an acceleration/deceleration of the device 900. The sensor component 914 may include a light sensor, such as a CMOS or CCD image sensor, for use in imaging applications. In some embodiments, the sensor component 914 may also include an accelerometer sensor, a gyroscope sensor, a magnetic sensor or a pressure sensor.

The communication component 916 is configured to facilitate communication, wired or wirelessly, between the device 900 and other devices. The device 900 can access a wireless network based on a communication standard, such as WiFi, 2G; or 3G or a combination thereof. In one exemplary embodiment, the communication component 916 receives a broadcast signal or broadcast associated information from an external broadcast management system via a broadcast channel. In one exemplary embodiment, the communication component 916 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 900 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer-readable storage medium including instructions, such as the memory 904 including instructions, and the instructions are executable by the processor 920 of the device 900, for performing the above-described methods. For example, the non-transitory computer-readable storage medium may be a ROM, a RAM (random access memory), a CD-ROM, a magnetic tape, a floppy disc, an optical data storage device, and the like.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other implementations of the disclosure will be apparent to those skilled in the art from consideration of the specification and practice of the disclosure disclosed here. The present application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for controlling an alarm clock, comprising:
    determining, by processing circuitry of an apparatus, an alarm time for the alarm clock of a first terminal device;
    when a time difference between a present time of the first terminal device and the alarm time is determined to reach a non-zero preset duration, determining, by the processing circuitry, whether a second terminal device is located within a reachable distance from the first terminal device, the second terminal device being associated with a first wearable device used by a user;
    when the second terminal device is determined to be located within the reachable distance from the first terminal device, acquiring, from the first wearable device, a sleep signal indicating the user being in one of two states including a sleep state and an awake state; and
    controlling the alarm clock and a second wearable device associated with the first terminal device based on the sleep signal, wherein
    when the sleep signal indicates that the user is in the awake state, determining whether one or more additional terminal devices are located within the reachable distance from the first terminal device, the one or more additional terminal devices being associated with one or more additional wearable devices.

2. The method according to claim 1, wherein the controlling the alarm clock and the second wearable device comprises:
    when the sleep signal indicates that the user is in the sleep state,
        sending a control signal to the second wearable device to cause the second wearable device to vibrate at the alarm time; and
        turning off the alarm clock of the first terminal device.

3. The method according to claim 1, further comprising:
    when the one or more additional devices are determined to be located within the reachable distance from the first terminal device,
        acquiring, from the corresponding one or more additional wearable devices, one or more additional sleep signals indicating sleeping status of one or more additional users of the one or more additional wearable devices; and
    when the one or more additional sleep signals indicate that each of the one or more additional users is in an awake state, controlling the first terminal device to trigger the alarm clock at the alarm time; and when the one or more additional devices are determined not to be located within the reachable distance from the first terminal device, controlling the first terminal device to trigger the alarm clock at the alarm time.

4. The method according to claim 1, wherein the determining whether the second terminal device is located within the reachable distance from the first terminal device comprises:

determining whether the second terminal device is connected to the first terminal device wirelessly using Bluetooth; and when the second terminal device is determined to be connected to the first terminal device wirelessly using Bluetooth, determining that the second terminal device is located within the reachable distance from the first terminal device.

5. The method according to claim 1, wherein the determining whether the second terminal device is located within the reachable distance from the first terminal device comprises:

determining whether the second terminal device is connected to the first terminal device wirelessly using one of: WiFi, a WiFi hotspot, and a mobile network; and when the second terminal device is determined to be connected to the first terminal device wirelessly,
determining a distance between the first terminal device and the second terminal device; and
determining whether the second terminal device is located within the reachable distance from the first terminal device based on the distance and a preset distance.

6. The method according to claim 1, wherein the determining whether the second terminal device is located within the reachable distance from the first terminal device comprises:

determining whether the first terminal device and the second terminal device are connected to a same wireless router or a same wireless access point; and when the first terminal device and the second terminal device are determined to be connected to the same wireless router or the same wireless access point, determining that the second terminal device is located within the reachable distance from the first terminal device.

7. The method according to claim 1, wherein the apparatus is the first terminal device.

8. A method for controlling an alarm clock, comprising:
determining, by processing circuitry of an apparatus, an alarm time for the alarm clock of a third wearable device;

when a time difference between a present time of the third wearable device and the alarm time is determined to reach a non-zero preset duration, determining, by the processing circuitry, whether a fourth wearable device is located within a reachable distance from the third wearable device;

when the fourth wearable device is determined to be located within the reachable distance from the third wearable device, acquiring, from the fourth wearable device, a sleep signal indicating a user of the fourth wearable device being in one of two states including a sleep state and an awake state; and controlling the alarm clock and the third wearable device based on the sleep signal, wherein when the sleep signal indicates that the user is in the awake state, determining whether one or more additional wearable devices are located within the reachable distance from the third wearable device.

9. The method according to claim 8, wherein the controlling the alarm clock and the third wearable device based on the sleep signal further comprises:

when the sleep signal indicates that the user is in the sleep state,
controlling the third wearable device to vibrate at the alarm time; and
turning off the alarm clock of the third wearable device.

10. The method according to claim 8, further comprising:
when the one or more additional wearable devices are determined to be located within the reachable distance from the third wearable device,
acquiring, from the one or more additional wearable devices, one or more additional sleep signals indicating sleeping status of one or more additional users; and
when the one or more additional sleep signals indicate that each of the one or more additional users is in an awake state, controlling the third wearable device to trigger the alarm clock at the alarm time; and
when the one or more additional wearable devices are determined not to be located within the reachable distance from the third wearable device, controlling the third wearable device to trigger the alarm clock at the alarm time.

11. The method according to claim 8, wherein the determining whether the fourth wearable device is located within the reachable distance from the third wearable device comprises:

determining whether the fourth wearable device is connected to the third wearable device wirelessly using Bluetooth; and when the fourth wearable device is determined to be connected to the third wearable device wirelessly using Bluetooth, determining that the fourth wearable device is located within the reachable distance from the third wearable device.

12. The method according to claim 8, wherein the apparatus is the third wearable device.

13. An apparatus for controlling an alarm clock, comprising processing circuitry configured to:

determine an alarm time for the alarm clock of a first terminal device;

when a time difference between a present time of the first terminal device and the alarm time is determined to reach a non-zero preset duration, determine whether a second terminal device is located within a reachable distance from the first terminal device, the second terminal device being associated with a first wearable device used by a user;

when the second terminal device is determined to be located within the reachable distance from the first terminal device, acquire, from the first wearable device, a sleep signal indicating the user being in one of two states including a sleep state and an awake state; and control the alarm clock and a second wearable device associated with the first terminal device based on the sleep signal, wherein when the sleep signal indicates that the user is in the awake state, determining whether one or more additional terminal devices are located within the reachable distance from the first terminal device, the one or more additional terminal devices being associated with one or more additional wearable devices.

14. The apparatus according to claim 13, wherein the processing circuitry is further configured to:
   when the sleep signal indicates that the user is in the sleep state,
      send a control signal to the second wearable device to cause the second wearable device to vibrate at the alarm time; and
      turn off the alarm clock of the first terminal device.

15. The apparatus according to claim 13, wherein the processing circuitry is further configured to:
   when the one or more additional devices are determined to be located within the reachable distance from the first terminal device,
      acquire, from the corresponding one or more additional wearable devices, one or more additional sleep signals indicating sleeping status of one or more additional users of the one or more additional wearable devices; and
      when the one or more additional sleep signals indicate that each of the one or more additional users is in an awake state, control the first terminal device to trigger the alarm clock at the alarm time; and
   when the one or more additional devices are determined not to be located within the reachable distance from the first terminal device, control the first terminal device to trigger the alarm clock at the alarm time.

16. The apparatus according to claim 13, wherein the processing circuitry is further configured to:
   determine whether the second terminal device is connected to the first terminal device wirelessly using Bluetooth; and
   when the second terminal device is determined to be connected to the first terminal device wirelessly using Bluetooth, determine that the second terminal device is located within the reachable distance from the first terminal device.

17. The apparatus according to claim 13, wherein the processing circuitry is further configured to:
   determine whether the second terminal device is connected to the first terminal device wirelessly using one of: WiFi, a WiFi hotspot, and a mobile network; and
   when the second terminal device is determined to be connected to the first terminal device wirelessly,
      determine a distance between the first terminal device and the second terminal device; and
      determine whether the second terminal device is located within the reachable distance from the first terminal device based on the distance and a preset distance.

18. The apparatus according to claim 13, wherein the processing circuitry is further configured to:
   determine whether the first terminal device and the second terminal device are connected to a same wireless router or a same wireless access point; and
   when the first terminal device and the second terminal device are determined to be connected to the same wireless router or the same wireless access point, determine that the second terminal device is located within the reachable distance from the first terminal device.

* * * * *